Figure 10:
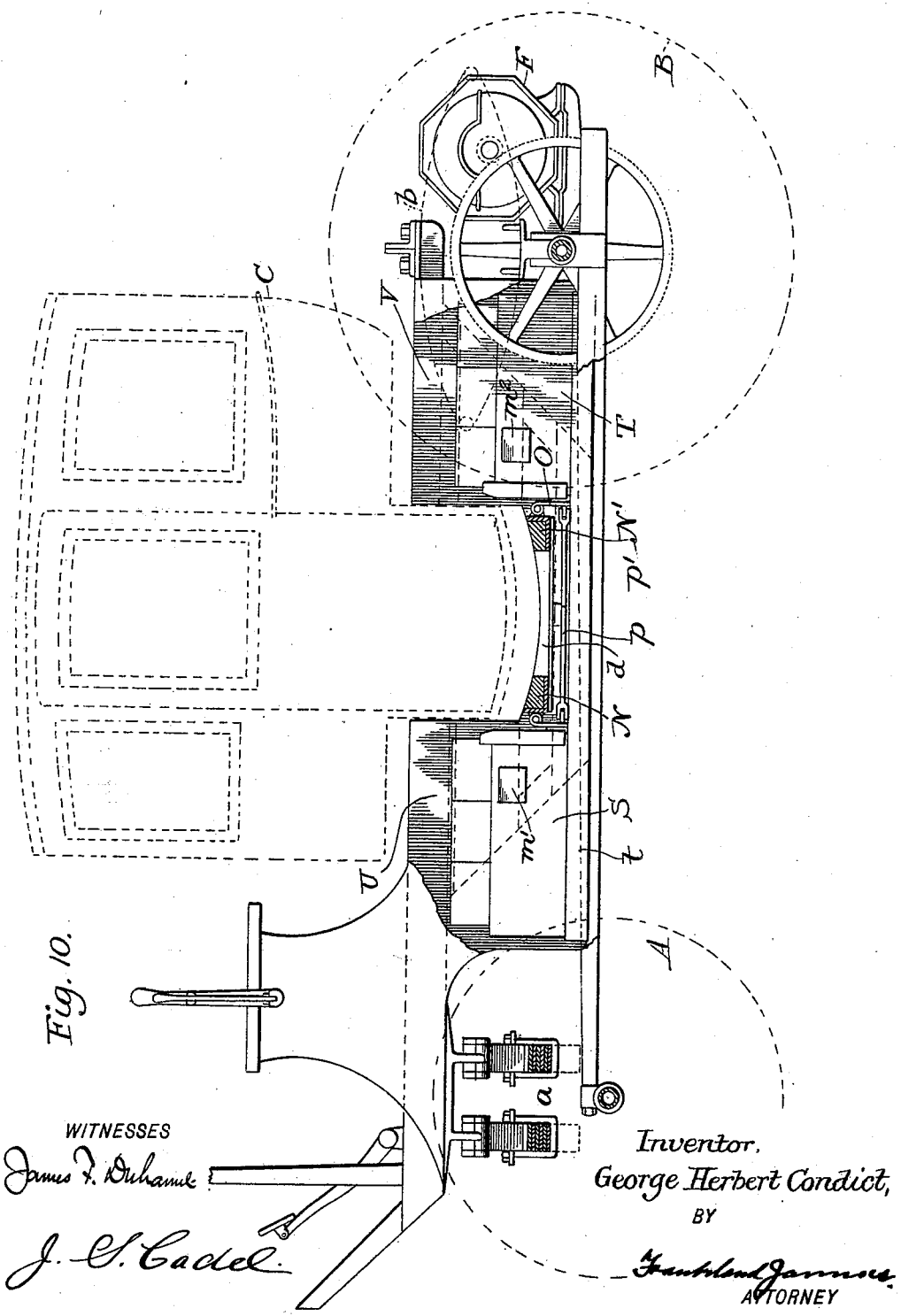

No. 647,914. Patented Apr. 17, 1900.
G. H. CONDICT.
BATTERY RECEPTACLE FOR ELECTRIC VEHICLES.
(Application filed Aug. 21, 1899.)
(No Model.) 5 Sheets—Sheet 1.
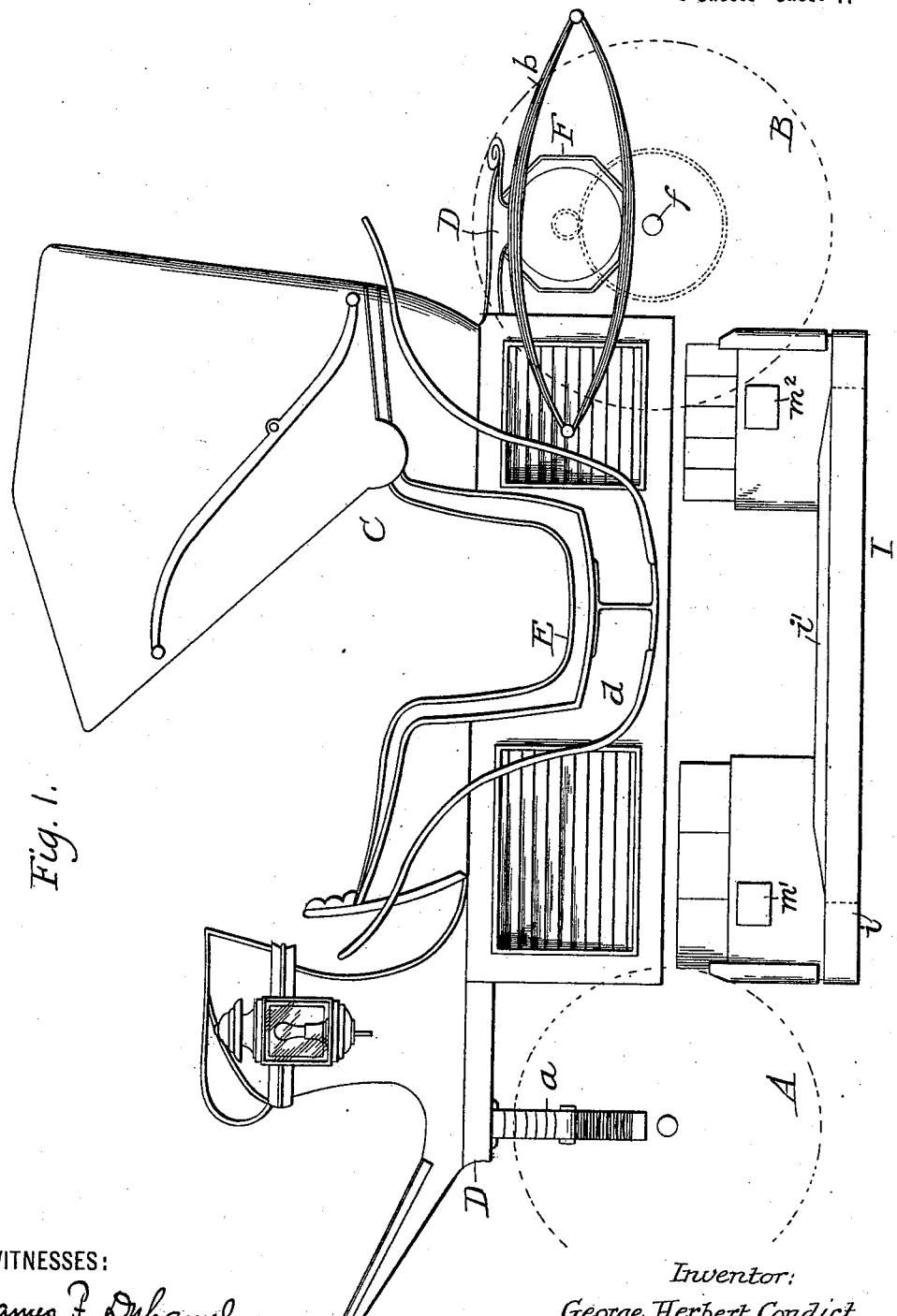
WITNESSES:
James F. Duhamel
J. S. Cadel
Inventor:
George Herbert Condict,
BY
Frankland Jannus
ATTORNEY

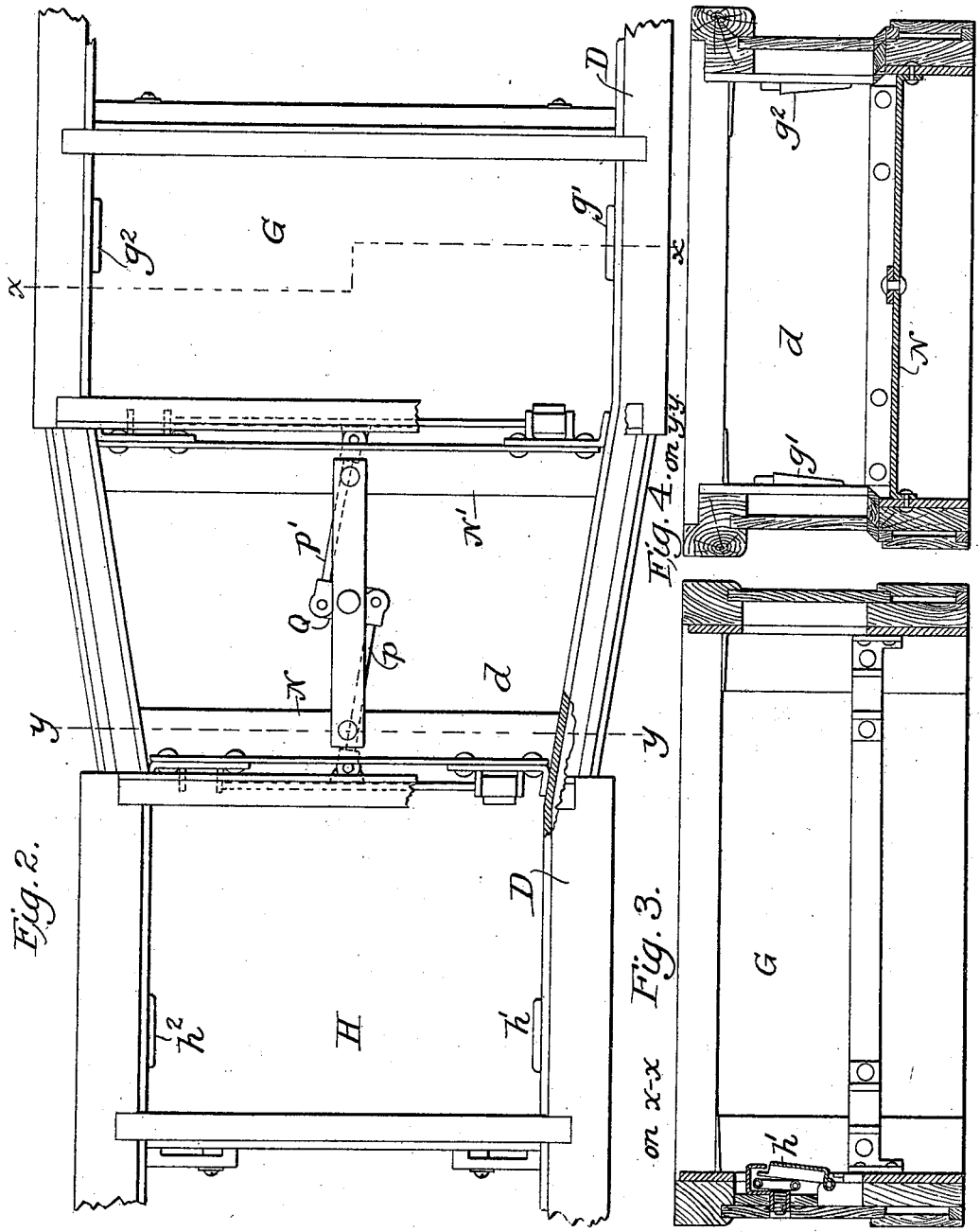

No. 647,914. Patented Apr. 17, 1900.
G. H. CONDICT.
BATTERY RECEPTACLE FOR ELECTRIC VEHICLES.
(Application filed Aug. 21, 1899.)
(No Model.) 5 Sheets—Sheet 3.
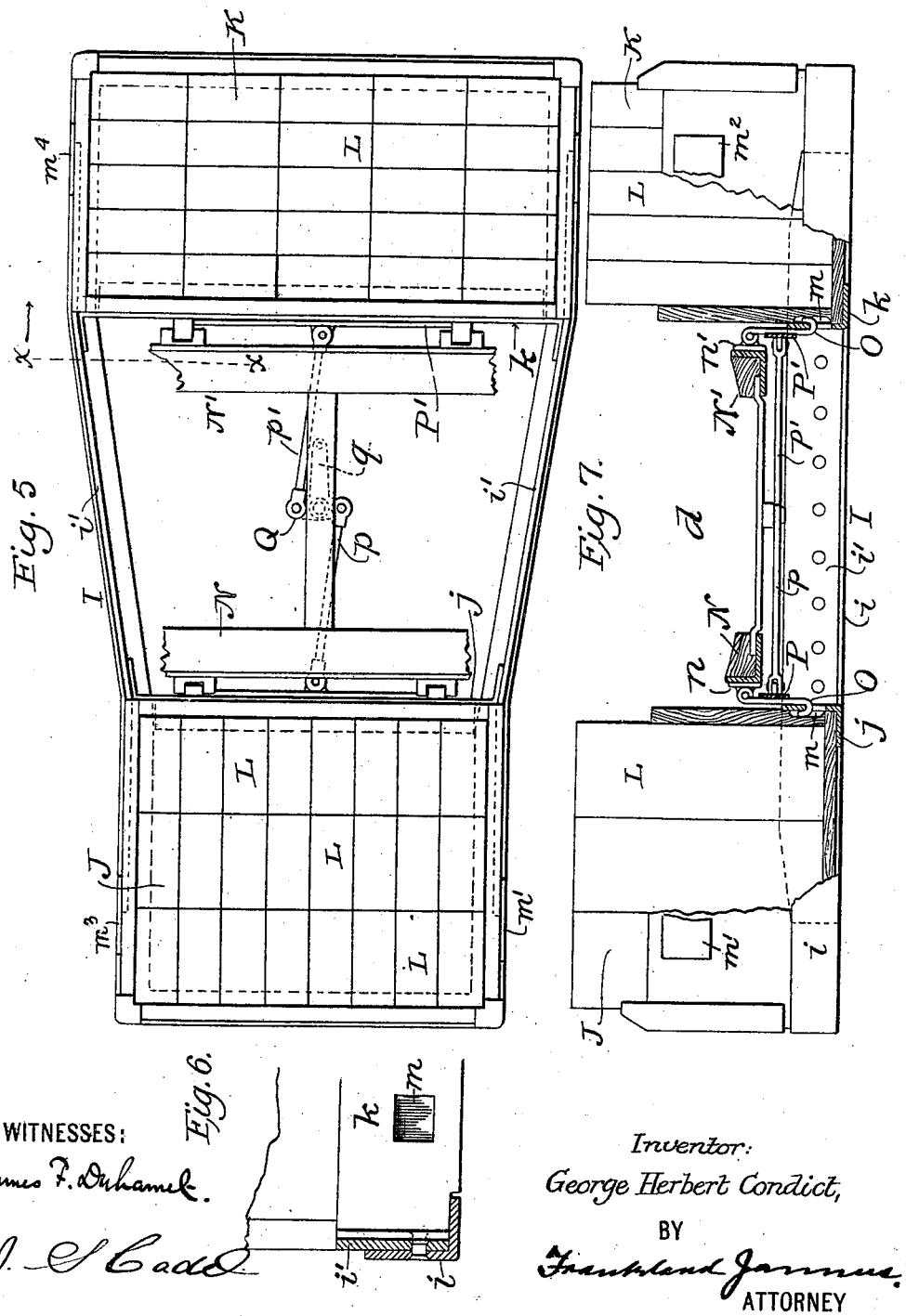
WITNESSES:
James F. Duhamel.
J. S. Cadd
Inventor:
George Herbert Condict,
BY
Frankland Jannus
ATTORNEY No. 647,914. Patented Apr. 17, 1900.
G. H. CONDICT.
BATTERY RECEPTACLE FOR ELECTRIC VEHICLES.
(Application filed Aug. 21, 1899.)
(No Model.) 5 Sheets—Sheet 4.
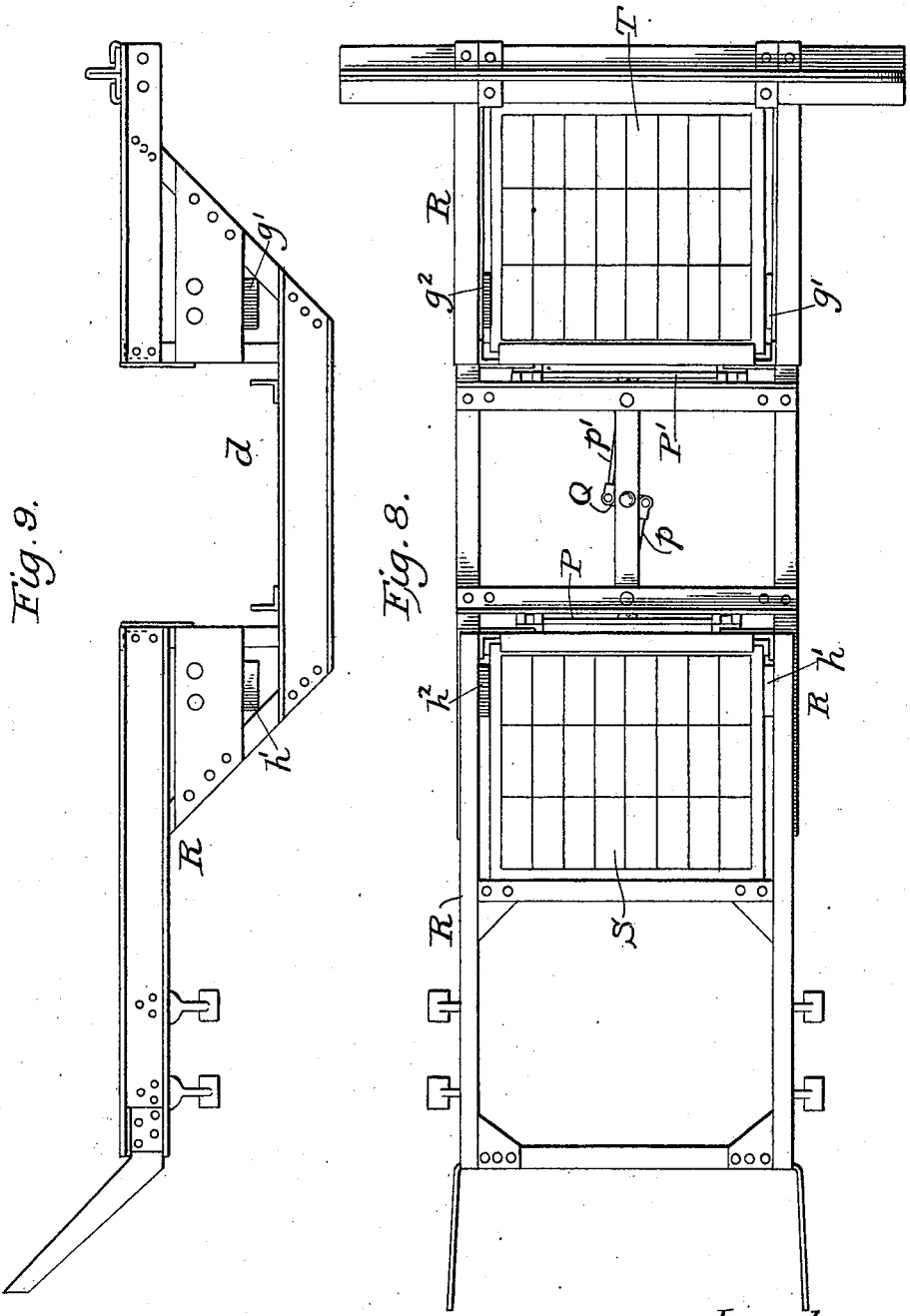
WITNESSES
James F. Duhamel
J. S. Cadel
Inventor:
George Herbert Condict,
BY
Frankland Jannus
ATTORNEY No. 647,914. Patented Apr. 17, 1900.
G. H. CONDICT.
BATTERY RECEPTACLE FOR ELECTRIC VEHICLES.
(Application filed Aug. 21, 1899.)
(No Model.) 5 Sheets—Sheet 5.

WITNESSES

Inventor,
George Herbert Condict,
BY
ATTORNEY

UNITED STATES PATENT OFFICE.

GEORGE HERBERT CONDICT, OF HARTFORD, CONNECTICUT.

BATTERY-RECEPTACLE FOR ELECTRIC VEHICLES.

SPECIFICATION forming part of Letters Patent No. 647,914, dated April 17, 1900.

Application filed August 21, 1899. Serial No. 727,934. (No model.)

*To all whom it may concern:*

Be it known that I, GEORGE HERBERT CONDICT, a citizen of the United States of America, and a resident of the city of Hartford, county of Hartford, State of Connecticut, have invented certain new and useful Improvements in Battery-Receptacles for Drop-Frame Motor-Vehicles, of which the following is a specification.

My invention relates to improvements in motor-vehicles of the type which are propelled by electric motors supplied with current from storage batteries carried by the vehicles.

The invention refers more particularly to the arrangement of storage batteries upon the vehicle with reference to the facility of removal of spent batteries and their replacement by similar batteries which have been fully charged and are ready for use.

It also refers to the application of a sufficient quantity of storage battery to vehicles of such construction as prevent the application of a single battery of sufficient size, but which according to my invention are supplied with an ample quantity of cells in two separated portions, which are so constructed as to be handled as a unit and by mechanical means.

My invention will be more fully set forth in the following description and referred to in the appended claims, in connection with the accompanying drawings, in which—

Figure 1 is a side elevation showing the body part of the running-gear of the vehicle, together with a tray of battery to be applied thereto. Fig. 2 is a top plan view, with portions broken away, of the battery-box or space in the body of the wagon shown in Fig. 1 within which the storage-battery cells are accommodated. Figs. 3 and 4 are transverse elevations, partly in sections, on the lines X X and Y Y, respectively, of Fig. 2. Fig. 5 is a top plan view of the battery-tray shown in Fig. 1, including also part of the sustaining devices. Fig. 6 is a detail on the line X X of Fig. 5. Fig. 7 is a side elevation, partly in section, of the battery-tray and sustaining devices indicated in Fig. 5. Fig. 8 is a plan view showing the frame of a vehicle, together with a battery-tray of same size and shape in each of its separated parts. Fig. 9 is a side elevation of one of the side frames of the vehicle running-gear as indicated in Fig. 8. Fig. 10 is a view in elevation, partly in section, showing the running-gear of a vehicle having a frame of the construction shown in Figs. 8 and 9, together with the battery in position, and a removable body, the latter in dotted lines.

As indicated in the drawings, the particular type of vehicles to which my present invention is applied is one in which the floor or bottom of the body is nearer the ground at the center than at the back and front, the body therefore occupying the central portion and leaving only a comparatively-small space between the said central downwardly-extending portion of the body and the rear axle and between it and the space in which the front wheels swing when it is desired to make a short turn. With horse-drawn vehicles these spaces are of little importance and are merely occupied by framework necessary to secure the construction, which will admit of the dip in the frame to accommodate the depressed central portion of the vehicle-body. Where, however, a vehicle is driven by a storage battery, the placing of a sufficient number of these upon the vehicle in positions where they will not interfere with the construction thereof or with the comfort of the passengers and which, moreover, can be separated into two groups so combined as to be handled as a single unit, then such an arrangement becomes of the utmost importance and forms the subject of the present invention.

A B (indicated in dotted lines) are the front and rear sets of wheels of the vehicle, of which C is the body, which may or may not be removable.

D D represent a frame-bar which by suitable construction is dipped downward in its middle portion to receive the depending portion E of the vehicle and is at its extremities supported upon the front and rear springs $a\,b$.

F indicates a motor which is secured at the rear of the vehicle and connected by suitable gearing with the rear axle $f$.

The body of the vehicle seen in Fig. 1 is wider in the rear portion than in the front. As seen in Fig. 2, G is the space underneath the rear portion of the body C, and H is the space under the front portion and forward of the depression $d$. These spaces are formed in the framework of the central portion of the vehicle running-gear, as indicated particularly in Figs. 2, 3, and 4, and as further indicated in said figures and also in Figs. 5 and 7 a latching device is secured in the lower portion of the depression $d$, which resembles in some of its mechanical features an invention for which I made separate application for Letters Patent, filed July 30, 1898, Serial No. 687,240.

In order to apply the storage-battery system to a vehicle of this type, my invention provides for overcoming the difficulty by constructing an elongated tray I, in the opposite ends of which are arranged two separate groups of storage-battery cells J K, the tray being continuous and so strong and rigid in construction that when lifted up under the vehicle into the space or battery-box formed of the two spaces G H under the parts of the body specified it can be latched into position and held as desired. The tray I itself is of very rigid construction. Its framework comprises an exterior angle-plate $i$. This is reinforced along the central portion of the tray by a second metallic plate $i'$, and these two plates are further reinforced by cross-plates $j\ k$, the ends of which are turned at right angles and riveted to the plates $i\ i'$. The ends of the tray I are floored and lined with wood to form trays which will contain and protect the battery-jars L, placed therein. Said tray is also provided with a number—for instance, four—of stationary contact-plates $m'\ m^2\ m^3\ m^4$, corresponding with inclined yielding spring-pressed contact-plates $h'\ h^2\ g'\ g^2$, which are permanently secured in position in the parts of the battery-box, as indicated in Figs. 2, 3, and 4. Each of the plates $j\ k$ is formed with an opening $m$, Figs. 6 and 7, to admit the ends of the supporting-hooks O. Across the depressed portion $d$ of the frame of the wagon are secured two angle-iron plates N N'. To the outer edges of these angle-iron plates are secured hinges $n\ n'$, in each of which, two or more on each side, are connected depending hooks O, which are in position corresponding with and are adapted to engage the edges of the openings $m$ in the plates $j\ k$, attached to the battery-tray. This attachment is made secure and reliable, since the upturned lower ends of the hooks O enter the said openings and engage the upper edges thereof. The hooks depending from the bar N are attached to a connecting-bar P, and the hooks connected with the opposite bar N' are similarly connected to a bar P', and to these two bars are pivotally attached links $p\ p'$, which links are in turn pivoted at their inner ends to the extremities of a central pivoted lever Q, which is provided with a suitable operating-handle $q$, by means of which when moved in one direction the said lever is oscillated to push the links away from each other and to extend the hooks O into the openings $m$ in the supporting-plates of the battery-tray and when turned in the opposite direction, the tray having been first slightly raised, to draw both levers toward the center and to pull the hooks out of the openings $m$, and thereby detach them from the supporting-plates of the battery to release the tray, so that it may be removed by lowering it away from the vehicle.

While I have described my invention as applied to a vehicle of such construction that only unequal spaces are found in which to bestow the battery, it is equally applicable to a construction in which the battery-tray can be symmetrically formed and alike at both ends. Such an arrangement is shown in Figs. 8, 9, and 10, in which a specially-devised truss-frame R is shown. Two of the frames R R are arranged in Fig. 8, and between them a battery-box is constructed in which is seen in plan view in Fig. 8 a tray of battery comprising the portions S T, united by a strong frame $t$, as is indicated in Fig. 10. The supporting-plates and the engaging hooks are the same with this arrangement, the principal difference being that the battery is constructed with both its separated portions alike instead of their being of different dimensions, as already described. The separated portions S T of the battery, Figs. 8 and 10, are applied from below, as already described, in any convenient manner—for instance, as set forth in my said prior application—the said separated portions S T entering and being housed in portions or spaces U V fore and aft of the central depression $d$ in the frame, the intervening bars by which the said battery is placed together spanning or extending across the bottom of the depression $d$ beneath the body itself and just below the attaching devices, which are similar to those described. The body as shown in dotted lines in Fig. 10 has been raised a few inches in order to indicate its separability from the running-gear, which forms a complete self-sustaining and self-propelling truck capable of receiving a variety of differently-constructed bodies.

While I have described my invention in connection with a vehicle of a particular type in which two relatively-small spaces are utilized to contain the desired quantity of storage battery by separating the same into two groups which are so mounted and sustained according to the invention as to be treated as a single unit both in loading and unloading the vehicle and in charging the battery, it will be apparent that it might also be desired in furtherance of the foregoing to divide the battery into more than two separate groups, and this might readily be done, in view of what is hereinbefore set forth, without departing from my invention, which is not limited to the specific employment of two separated portions of the storage battery, but would apply equally well to the employment of a secondary battery divided into more than two groups for the purpose of utilizing otherwise insufficient spaces and at the same time minimizing the time and labor required to resupply the vehicle with this motive power.

Having now described my invention, what I claim is—

1. A tray for containing and supporting battery, said tray divided into a plurality of separated parts joined together so as to constitute and be handled as a single unit.

2. A battery-tray divided into two separate parts joined together so as to constitute and be handled as one.

3. The combination with a motor-vehicle having separated receptacles for storage battery, of a plurality of groups of storage battery connected together so as to be handled as a single unit.

4. A tray containing storage battery having two separate receptacles therefor, said receptacles being separated so as to occupy different positions upon the vehicle, but rigidly connected so as to constitute a single unit.

5. A battery-tray having a battery-receiving receptacle at each end separated by a central space and connected by a suitable frame, supporting-plates in said central space and connected with the frame of the tray.

6. The combination with a vehicle, the frame of which has a transverse central depression, a battery box or tray on each side of the depression and a tray adapted to carry storage batteries and formed in two separated portions each adapted to fit in one of the battery-receiving spaces of the vehicle and the two said portions being rigidly connected so as to form a single staple unit.

7. The combination with a motor-vehicle having a transverse depression in its frame, battery-receiving spaces in front of and in the rear of the depression, supporting-hooks and means for moving them toward or away from a central point simultaneously, said hooks located in the lower part of the depression in the frame of the vehicle and a storage-battery-supporting tray having two groups of battery, one on each end corresponding with the battery-receiving spaces in the vehicle upon opposite sides of the depression, and rigid plates extending across the tray adapted to register with and engage the supporting-hooks upon the vehicle.

Signed by me at New York, N. Y., this 18th day of August, 1899.

GEORGE HERBERT CONDICT.

Witnesses:
FRANKLAND JANNUS,
J. HARRY HULL.